(No Model.)
G. BEEKMAN.
PICKING MECHANISM FOR COTTON HARVESTERS.
No. 313,276. Patented Mar. 3, 1885.
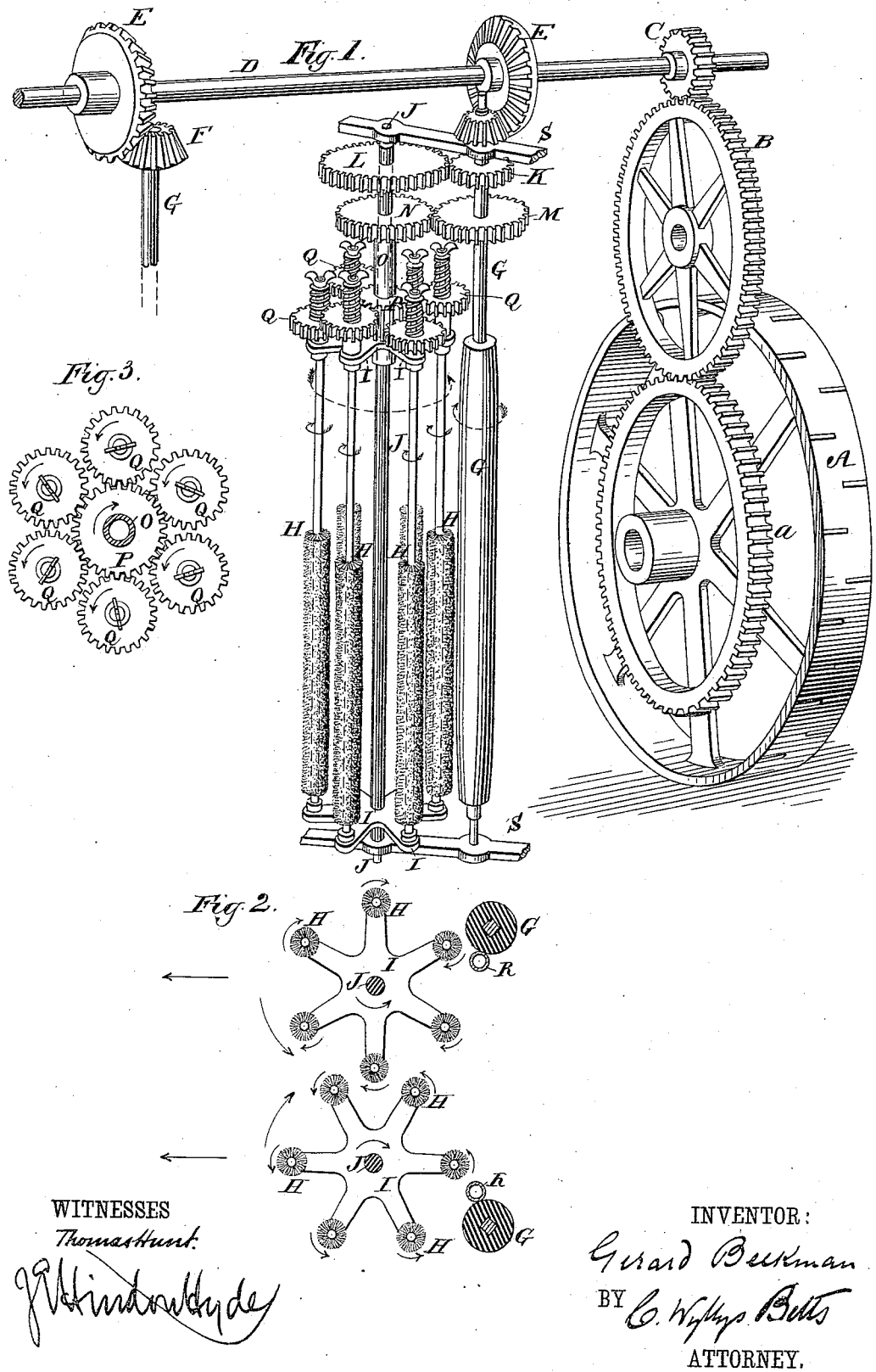
WITNESSES
INVENTOR:
Gerard Beekman
BY C. Wyllys Betts
ATTORNEY.

UNITED STATES PATENT OFFICE.

GERARD BEEKMAN, OF NEW YORK, N. Y.

PICKING MECHANISM FOR COTTON-HARVESTERS.

SPECIFICATION forming part of Letters Patent No. 313,276, dated March 3, 1885.

Application filed May 13, 1884. (No model.)

*To all whom it may concern:*

Be it known that I, GERARD BEEKMAN, a citizen of the United States, residing at New York, in the county of New York and State of New York, have invented a new and useful Improvement in the Picking Mechanism for Cotton-Harvesters, of which the following is a specification.

My invention relates to improvements in the picking mechanism for the class of cotton-harvesters for which Letters Patent of the United States were granted to me May 25, 1880, No. 227,949; and the objects of my improvements are, first, to provide an improvement in the form, arrangements, and motion of the picker or picking burrs, so that a series of them will revolve around a common center, and also each picker on its own axis, in a sort of "orrery" movement; second, to greatly reduce the amount of friction by allowing the systems of pickers to do the work of the compressing-belts shown in my former patent.

The form of carriage in which the picking mechanism herein described is placed, may be the form shown in the said Letters Patent No. 227,949, or any other form by which the picking mechanism is brought into contact with the plant, and preferably in the form of the carriage for cotton-harvesters described in the application for Letters Patent to be filed hereafter.

I employ in my pickers, as described in my Patent No. 227,949, "any suitable substance which entangles itself with and will seize the fibers of cotton projecting from the ripe bolls, but not with the leaves, stems, and unripe bolls," and I preferably use the fine wire described in my former patent.

For cleaning mechanism, I preferably employ a pair of rollers to remove the cotton from the pickers in the form shown in my former patent and in the improved form shown in an application filed herewith, although my orrery system of pickers will be useful with other forms of cleaning mechanism.

I attain the objects of my present invention by the mechanism illustrated in the accompanying drawings, in which—

Figure 1 shows in perspective the driving wheel and gearing for giving motion to the mechanism and the rod connecting the system of pickers and also the gearing connected with one of the cleaning-rollers, and thence with one of the systems of pickers, and also the central axis of this orrery system and the picking-rods each separately revolving. Fig. 2 is an enlarged view of a transverse section through the two orrery systems of picking-rods, showing their relative position. Fig. 3 is a plan view of the gearing for revolving the picker-rods.

Similar letters refer to identical parts throughout the several views.

Power is preferably communicated from the driving-wheel A through the intermediate wheel, B, to the pinion C. This pinion C is attached to the horizontal shaft D, at the top of the machine, upon which shaft are keyed the beveled gears E E, and the connection of the pinion C with this shaft D should be by a dog and ratchet or clutch, (not shown,) so that if the harvester be backed the machinery will not operate. The following is found a practical way of conveying motion to the mechanism herein described. Each of the beveled gears E E meshes at its own side of the harvester with the bevel-gear F, preferably upon the shaft of the cleaning-roller G, and from it motion is conveyed to the picking mechanism which I prefer to have connected by the shaft D in order that the systems of revolving pickers may overlap one another in the channel-way without danger of interference, as shown in Fig. 2.

The compressing of the cotton-plant and spreading it out like a fan was accomplished in my former patent by systems of belting upon the sides of the converging channel-way; but the orrery systems of pickers herein described, rotated in the same direction as the passing plant, and at substantially the same speed, will of themselves sufficiently compress the plant to allow all the cotton to be reached, and will carry the plants through the machine with little friction and better grasp of the cotton than was the case in the former patented machine.

To prevent the crushing of the plant, or the covering of the cotton to be picked by leaves or boughs, the guards in front of the picker shown in my former patent are omitted, and each system of pickers is composed of several independent and independently rotating picker-rods, H H, held in the frame I I, which, itself, also rotates on its axis J. Each of said rods extends from the top to the bottom of the rotating frame. These picking-rods H H should be sufficiently separated to allow the branches of the plant to freely enter between them, (see Fig. 2,) but not so much that cotton-bolls could enter and not be reached by the pickers. Thus, if the frame holding these rods is seven inches in diameter with a circumferance of twenty one inches, six or seven of these picking-rods may preferably be used in it. If the frame I I is larger, more picking-rods may be employed. These rods are made to rotate separately and preferably in a direction contrary to that of the frame carrying them.

By the revolution of the frame I I upon its axis J, each picker is made to stand, so far as its vertical central line is concerned, in a substantially motionless position in its relation to the bush with which it comes in contact, moving along from the front toward the rear of the harvester at substantially the same rate of speed as the passing plant and in the direction shown by the large arrows in Fig. 2. Therefore the hooking of the cotton and drawing it out of the bolls and off the plant takes place solely by the revolution of each picker-rod upon its own axis, thus twisting the cotton adhering to it out of the plant-bolls. This double motion of each picker-rod on itself and of the whole system of rods about the common central axis, J, produces an orrery motion.

Fig. 1 shows the frame for the support of the picker-rods. This frame consists of upper and lower star-shaped heads rigidly connected together by a central axis or rod, J. The several points of these two star-shaped heads are pierced with holes forming the bearings for the picker-rods to revolve in. The central axis has at the lower end a shoulder upon which it may revolve, and its upper end is properly adapted for keying on a gear-wheel to set the orrery system in motion. This shaft J and the shaft of the roller G revolve in the frame S S.

Fig. 1 also represents the orrery picker with the picker-rods in position. The whole forms an arrangement that will allow the bush to spring open and spread through the body of the orrery picker, and will thus allow the picker-rod to search every part of the plant.

Fig. 1 also represents the gear for producing the motion in the system of pickers on the right-hand or "off" side of the machine. The cleaning-roller G moves in the direction indicated by the short curved arrows. The main axis of the system of pickers rotates as indicated by the long curved arrow.

The following has been found a suitable way of conveying motion to the cleaning-rollers and orrery system of pickers, so as to give the proper speed, though I do not limit myself to any particular speed or method of propulsion.

Assuming that the wheel A, Fig. 1, upon which the machine moves, is three and one-half feet in diameter, it will have a circumference of, say, ten and one-half feet, (one hundred and twenty-six inches.) The gearing $a$ upon this wheel should be about two and one-half feet in diameter, giving a circumference of, say, ninety inches. The pinion C upon the shaft D should then be five inches in diameter, with a circumference of, say, fifteen inches. Thus at each revolution of the wheel A the machine would pass over one hundred and twenty-six inches of ground, and the shaft D, which conveys motion to the mechanism on both sides, will revolve about six times, turning at the same time the wheels E E. The wheels E should each be beveled and geared into a beveled pinion, F, of one-third the diameter of said wheel E, the pinion F being upon the end of the shaft of the cleaning-roller G, thus giving to that roller about eighteen revolutions to each revolution of the main driving-wheel A. Upon the shaft of the roller G should be the pinion K, geared into the wheel L upon the main shaft J of the system of pickers, L having three times the diameter of pinion K, and hence the main shaft of the system of pickers will revolve six times at each revolution of the main wheel A. Now, if the arms of the frame I I are each three and one-half inches long, the axes of the picking-rods H in their revolution around the main axis J will describe a cylinder whose diameter will be seven inches and its circumference about twenty-one inches; hence, the frame I I, carrying the picking-rods, making six revolutions to one of the main driving-wheel, and at each revolution said axis of the picking-rods passing through a space of twenty-one inches, they will travel one hundred and twenty-six inches while the driving-wheel revolves once; and as the circumference of this driving-wheel is one hundred and twenty-six inches, each picking-rod will move backward through the machine at substantially the same rate of speed as the passing plant. Upon the shaft of the roller G, below the pinion K, is attached the cog-wheel M, which gears into the gear-wheel N, which forms one end of a loose sleeve or spool, N O P, moving freely on the main shaft J of the system of pickers. This spool N O P and its connections with the picker-rods are more clearly shown in Fig. 3. The other end of the spool or sleeve O is a cog-wheel, P, which gears into the cog-wheels Q Q upon the ends of the axes of the pickers H H. If the picker-rods are small, as shown in the drawings, they will be more efficient the faster they move, provided that they do not revolve so rapidly as to develop centrifugal force sufficient to throw off the cotton from their points or to make too much friction on the bush.

In the drawings the pickers are represented as moving about four or five times to each revolution of the main axis J, but it is impossible to state with accuracy the best number of revolutions of the picking-rods during each revolution of the main axis J, for this will always depend upon how fast the harvester is driven over the ground. If it be found that the cotton is thrown off the points of the picker-rods by centrifugal force, then the machine will be more effective when driven more slowly; or for more rapid driving the relative sizes of the cogs M and N should be altered.

Fig. 2 is a view from above of the systems of pickers and of the picker-rods H in position. The large curved arrows indicate the direction of revolution of the systems of pickers. The small curved arrows indicate the direction of rotation of the individual pickers. The straight arrow indicates the direction in which the plants pass through the machine.

G G R R indicate the cleaning-rollers shown in the application filed herewith, or in my former patent, No. 227,949. This figure shows the positions successively assumed by the different picker-rods as they revolve about their two common centers with their orrery movement. One or more pairs of these orrery systems may be placed in the channel-ways, or only one orrery picker may, in machines of very light draft, be employed with a roller or belting on the opposite side of the channel-way.

That which I claim as my invention, and desire to secure by Letters Patent, is—

1. In a machine for harvesting cotton, the orrery picker consisting of the frame I I, containing separately-rotating vertical pickers, the whole revolving on its main vertical axis, and each separate picker revolving on its own axis, substantially as described.

2. In a cotton-harvester, the orrery picker consisting of the vertical shaft J, provided with the gear-wheel L, the sleeve O, loosely mounted on said shaft and provided with the gear-wheel N and pinion P, the frame I I, secured to said shaft, and two or more picking-rods, H, carried by said frame and provided with pinions Q, gearing with said pinions P, substantially as described.

3. In a machine for harvesting cotton, one or more vertical picker-rods, each revolving on its own axis, in combination with means to impart to each axis a motion backward through the machine at substantially the same speed as that of the machine over the ground, and always at substantially the same distance from the ground, substantially as described.

4. The herein-described device for harvesting cotton, consisting of the heads I, suitably connected at a distance apart, and means for rotating them about a central axis, in combination with a series of pickers, H, mounted in said heads substantially parallel to the axis of the heads, and means for giving said pickers an independent rotary movement in said heads, as and for the purpose set forth.

5. In a machine for harvesting cotton, the heads I, adapted to revolve about a vertical axis, pickers H, mounted vertically in said heads, and means for independently revolving said pickers about their own axes, in combination with actuating mechanism connected, substantially as described, with the drive-wheel of the machine, to impart a rotary movement to the heads I and successively carry the pickers H rearwardly on the acting side of the picker at the same rate of speed as the forward movement of the machine, substantially as specified.

GERARD BEEKMAN.

Witnesses:
C. WYLLYS BETTS,
J. E. HINDON HYDE.